United States Patent [19]

Struthers

[11] 4,348,465

[45] Sep. 7, 1982

[54] NITROGEN METAL FUEL CELL

[75] Inventor: Ralph C. Struthers, Saugus, Calif.

[73] Assignee: Universal Fuel Systems, Inc., Saugus, Calif.

[21] Appl. No.: 205,866

[22] Filed: Nov. 10, 1980

[51] Int. Cl.³ ............................................. H01M 8/08
[52] U.S. Cl. ...................................... 429/27; 429/29; 429/34; 429/41
[58] Field of Search ....................... 429/41, 34, 12, 15, 429/46, 29, 27, 105, 101, 108, 38

[56] References Cited

U.S. PATENT DOCUMENTS

| | | | |
|---|---|---|---|
| 3,092,516 | 6/1963 | Rightmire | 429/34 |
| 3,196,048 | 7/1965 | Shropshire | 429/41 |
| 3,202,547 | 8/1965 | Rightmire et al. | 429/34 |
| 3,284,239 | 11/1966 | Hunger et al. | 429/12 X |
| 3,506,493 | 4/1970 | Eisenberg | 429/12 X |
| 3,527,618 | 9/1970 | Bushnell | 429/12 |
| 3,540,933 | 11/1970 | Boeke | 429/19 |

Primary Examiner—Anthony Skapars

[57] ABSTRACT

A nitrogen-metal fuel cell comprising a cathode and an anode in spaced relationship, a first electrolyte solution contacting the cathode, a second electrolyte solution contacting the anode and an ion transfer membrane between the electrolytes to prevent commingling thereof and through which hydroxyl ions freely move. The cathode comprises an aqueous solution of nitrate and an ion transfer membrane between the solution and the electrolyte contacting the cathode.

18 Claims, 2 Drawing Figures

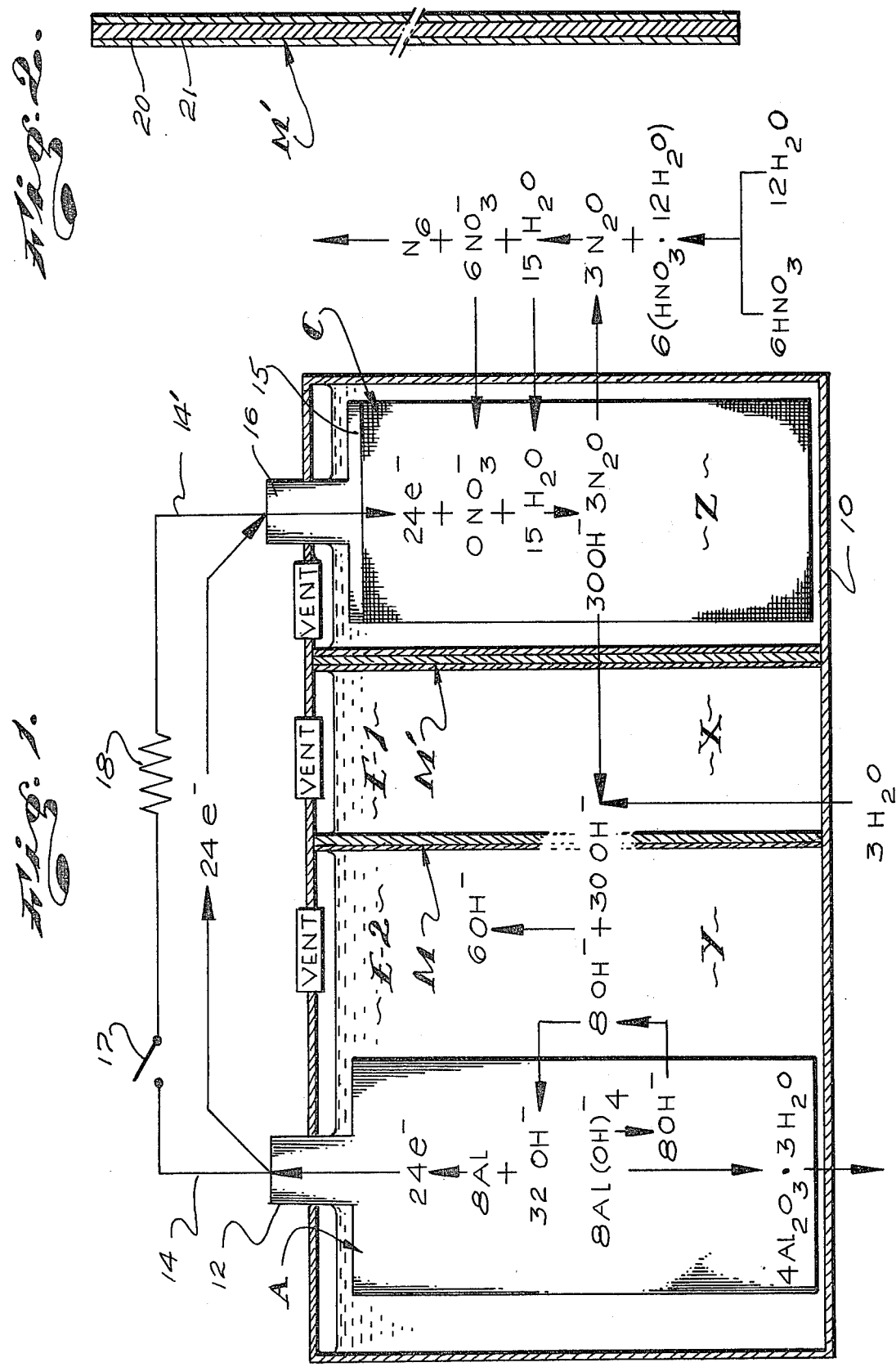

NITROGEN METAL FUEL CELL

This invention relates to that class of electro-chemical cells commonly referred to as fuel cells and is particularly concerned with a novel fuel cell structure including a metal anode and a nitrogen compound cathode.

An object of my invention is to provide novel fuel cells comprising containers, anode electrodes of aluminum or other desired metal fuel within the containers, nitrogen compound cathode electrodes in the containers in spaced relationship from the anode electrodes therein and electrolytes of alkaline or base material, in aqueous solution, in the containers between and in contact with the spaced apart electrodes.

In the art of fuel cells, the chemical reactions between a single electrolyte and its related anode and cathode electrodes are different and such that most effective and desired reactions at both electrodes is unattainable. Accordingly, in the overwhelming majority of cases, the electrolytes in cells are formulated to provide a compromise of reactions attainable at the anode and cathode electrodes. For example, in fuel cells with aluminum anodes, to eliminate or reduce excessive corrosion of the aluminum and the formation of undesirable quantities of hydrogen gas and yet obtain efficient utilization of the anode, the electrolyte is compounded to reduce corrosion of the anode to acceptable levels. With few or rare exceptions, an electrolyte which effectively attains the foregoing end is relatively ineffective to establish and maintain a most desired and effective reaction with or at the cathode electrode. The foregoing suggested to me that the problem presented could best be solved by a fuel cell structure in which two different but compatible electrolytes might be effectively utilized; one for the anode electrode and the other for the cathode electrode, whereby a most effective and efficient reaction might be attained at both the anode and at the cathode electrodes than is attainable by utilizing a single electrolyte.

An object and feature of this invention is to provide a fuel cell of the general character referred to above which includes and utilizes two different electrolytes, one of which contacts and reacts with the cathode electrode in a most effective and desired manner and the other of which contacts and reacts with the anode electrode in a most effective and desired manner; and a cell wherein the two electrolytes are separated and prevented from commingling by an ion transfer membrane within the container of the cell and through which hydroxyl ions moving from one electrolyte to the other and from the cathode to the anode freely move.

It is another object and feature of my invention to provide a fuel cell of the general character referred to above wherein the nitrogen compound cathode electrode is established of an aqueous solution of nitric acid and is separated from its base electrolyte solution by an ion transfer membrane having a catalyzed surface in contact with the cathode solution and at which reaction of or within the cathode electrode takes place.

Yet another object and feature of my invention is to provide a novel ion exchange membrane for fuel cells of the general character referred to above which membrane can be an ion exchange means which is permeable to and through which negatively charged hydroxyl ions (anions) are free to move and through which positively charged ions (cations) will not move.

To foregoing and other objects and features of my invention will be fully understood from the following detailed description of my invention in which reference is made to the accompanying drawings.

DESCRIPTION OF THE DRAWINGS

FIG. 1 is a diagrammatic view of a fuel cell embodying my invention, with the chemical reaction noted thereon; and FIG. 2 is a diagrammatic view of an ion transfer member as provided and used in my invention.

DETAILED DESCRIPTION OF THE INVENTION

In FIG. 1 of the drawings, I have diagrammatically illustrated one typical embodiment of my new fuel cell. The fuel cell includes a closed container 10 having right and left hand ends. The container is preferably divided between its ends, by a first fluid barrier-ion transfer membrane M. The membrane M divides the interior of the container into right and left hand electrolyte compartments or sections X and Y.

A second fluid barrier-ion transfer membrane M' is arranged in the container between the membrane M and the right-hand end of the container to define a cathode compartment or section Z, at the right hand end of the container, separate from the chamber or section X.

For the purpose of describing and best understanding the basic nature and function of my invention, it is sufficient to note and understand that the membranes M and M' are such that they effectively prevent the passage of fluids while allowing for the free movement of hydroxyl ions $8(OH^-)$ therethrough. The structural makeup and functional aspects of the membranes will be more fully described in the following.

The chambers or sections X and Y are filled with fluid electrolytes E-1 and E-2. The electrolytes are, for example, aqueous alkaline or base solutions. In furtherance of my invention, the electrolyte E-1 is directly associated with the cathode electrode C, is stronger or more alkaline than the electrolyte E-2, which is directly associated and reacts with the anode electrode A. While the electrolytes are of unequal strength, their electrolitic conductivity is very nearly the same within the operating parameters of the cell.

In one carrying out of my invention, the electrolytes E-1 and E-2 are composed primarily of sodium hydroxide or potassium hydroxide in an aqueous solution and can include or have added thereto certain corrosion inhibitors.

The stronger electrolyte E-1 is especially formulated to attain a desired electrolitic potential at and to attain a most effective and efficient chemical reaction with the cathode electrode C. The weaker electrolyte E-2 is especially formulated to attain desired electrolitic potential at and to attain the most effective and efficient chemical reaction at the anode A.

In those cases where the anode A is aluminum, the electrolyte E-2 is especially formulated so that corrosion reaction with and between the electrolyte E-2 and the anode and the formation of hydrogen gas within the cell is eliminated or reduced to a minimum or negligible extent. To this end, it has been found that when the PH of a base electrolyte is adjusted by the adding of an acid, that little or no corrosion reaction occurs if an acid having a low PKl value is used. In accordance with the foregoing, it has been determined that the PH of a base electrolyte is adjusted to about 14 by the addition of an acid having a PK1 value of 0.10, or less, corrosion reaction between the electrolyte and the aluminum anode and the generation of hydrogen gas is substantially eliminated or reduced to a negligible extent. In accordance with the foregoing, in carrying out my invention, the PH of the electrolyte E-2 is adjusted by the addition of an acid having a PK1 value of 0.10 or less.

In one preferred carrying out of my invention, the anode A is a metal or aluminum plate arranged in the section X of the cell, within the electrolyte E-2, in spaced relationship from the membrane M. The anode A has a terminal post 12 or the like which projects from the container 10 to connect with one end of a conductor 14 of an electric circuit in which the cell is connected.

The anode A can be established or pure aluminum or can be established of aluminum alloyed with limited amounts of suitable promoters and/or inhibitors such as gallium, calcium, magnesium and/or zinc.

In the above noted example, where the anode is established of aluminum, it is preferred that the aluminum be 99% pure and that the quantity of other materials or elements that might be added as promoters and/or inhibitors not exceed 1%.

The equation of corrosion reaction of a pure aluminum anode such as referred to above is $$2Al^{+++} + 6H_2O + 2OH^- \rightarrow 2Al(OH)_4^- + 3H_2.$$

While in the example given, aluminum is utilized as the anode fuel, it will be apparent and is to be understood that other metal fuels can be advantageously employed instead of aluminum, without departing from the broader aspects and/or spirit of my invention.

The cathode C is or includes a fluid nitrogen compound fuel and is, in the example given, an aqueous nitric acid solution expressed as: $6HNO_3.12H_2O$ (appearing at the lower right-hand of FIG. 1 of the drawings). The nitrogen compound is introduced or fed into the chamber or cathode section Z of the cell where it contacts the right hand or cathode surface of the membrane M'. (The opposite, left hand or electrolyte surface of the membrane M' is contacted by the electrolyte E-1).

The cathode C further includes a collector plate or screen 15 immersed in the nitrogen compound. The collector plate has a terminal post 16 projecting from the container 10. The post 16 is connected with a conductor 14' of the electrical circuit in which the cell is connected.

The above referred to electrical circuit is shown provided with an on and off switch 17 and a load 18, connected in series with and between the conductors 14 and 14' and their related terminal posts 12 and 16.

In operation, when the on and off switch 17 is open, the cell structure is in equilibrium and no reaction takes place. When the switch is closed, or a closed circuit is otherwise established between the anode A and cathode C, electrons flow from the anode A into the nitrogen compound cathode C and a reaction takes place which generates or forms hydroxyl ions. The hydroxl ions thus generated or formed move to and through the membrane M', electrolyte E-1, membrane M, electrolyte E-2 and to the anode A. When the hydroxyl ions meet, the anode A, which in the example given, is aluminum, they react with the atoms of the aluminum to form free electrons, extra hydroxyl ions and a by-product of aluminum trihydrate ($4Al_2O_3.3H_2O$). During continuous protracted operation of the cell, the above noted by-product must, from time to time, be extracted or removed from the cell to maintain effective and efficient operation thereof.

The free electrons generated at the anode A are conducted through the electrical circuit, including the load 18, where work is performed, and back and into the cell at the cathode C.

Anode $$8AL + 32OH^- = Al_2O_3.3H_2O + 8OH^- + 24e^-/Eox + 2.33$$

Cathode $$6NO_3^- + 15H_2O + 24e^- = 3N_2O + 30OH^-/Ered + 0.31$$

Net Reaction $$8AL + 6NO_3^- + 15H_2O = 4AL_2O_3.3H_2O + 3N_2O = 6OH^-/Ecell = 2.6$$

To attain and maintain the above described fuel cell operation in an effective and efficient manner, the cathode C of the cell must be suitably catalyzed with or by a suitable promoter. In the preferred carrying out of my invention and in the example given, copper is used as the promoter or catalyst for the cathode.

In practice, the metal or copper catalyst can be applied to the membrane M' in metallic form and in predetermined amounts, in any desired or suitable manner at the time of manufacturing the cell. Alternatively, the copper can be introduced into the cell in the form of a predetermined quantity of copper nitrate, added to the nitrogen compound cathode fuel, when the cell is first put into operation.

With the metal or copper cathode thus provided, when the cell is in operation, the metal, electrons and nitrogen compound react within the cell structure whereby the molecules of the metal catalyst are electrolytically dissociated or broken up into ions, which ions join or combine with the compound. As reaction in the cathode section of the cell continues, the metallic components or ions in the solutions move toward the anode A and are stopped at and are redeposited in metall form by electrolytic deposition on the cathode surface of the ion transfer member M', preparatory to supporting continuing catalyzation of the reaction within the cathode section in the manner set forth above.

In the above noted reaction, the copper is deposited in molecular size particles on or at the membrane M', thus providing a metallic catalyst with what is believed to be the greatest possible surface area and a catalyst which is believed to present the greatest possible number of active sites.

In one preferred carrying out of my invention, and as diagrammatically illustrated in FIG. 2 of the drawings, the ion transfer membrane M' is established of a layer or sheet 20 of fine filter paper which is chemically inert in the environment in which it is to be used and on or about which is deposited a layer 21 of petroleum wax, such as paraffin, through which hydroxyl ions will freely move, but which establishes an effective barrier to liquids and other particulate materials in the cell structure. The sheet 20 is in fact a carrier for and supports the layer 21 of wax, which layer of wax constitutes the ion transfer membrane. The membrane M' is arranged to extend across the interior of the container 10 and to define the cathode section or compartment Z therein.

In addition to the above, the membrane M' can and is preferably provided with a second sheet or layer 22 of fine porous and absorbant filter paper and overlying the cathode surface of the wax layer or barrier.

The porous absorbant layer is or serves as a carrier for the metallic catalyst.

After the cell structure (in which the above noted membrane structure M' is used) is assembled and the cell is initially put into service, a starter charge of hydrogen compound fuel with a predetermined quantity of metal (copper) nitrate added and in solution therein, is introduced into the cathode section Z of the cell. Thereafter, the circuit between the anode and cathode of the cell is closed and free electrons are caused to flow into the cathode. The electrons, water and nitrates react to form hydroxyl ions, nitrous oxygen or nitrogen monoxide ($N_2O$) gas and metallic copper. The hydroxyl ions move through the cell structure from the cathode to the anode. The nitrogen monoxide gas is reabsorbed in the hydrogen compound and the metallic copper constituent of the copper nitrate additive catalyzes the reaction in the cathode and precipitates and/or is deposited on and within the absorbant catalyst carrier 22 in molecular size particles, thus providing a catalyst with large surface area and many active sites. After the nitrate components of the copper nitrate in the start-up solution have been consumed and the copper components thereof are deposited on and within the catalyst carrier 22 on the membrane M, the regular nitrogen compound fuel is fed into the cell and normal ongoing operation of the cell can be or is maintained, in the manner previously described.

The provision and use of the above noted porous absorbant catalyst carrier 22, adjacent the cathode surface of the membrane M', is considered to be highly desirable as it effectively supports and carries the small metallic particles of the catalyst in a manner wherein the metal can be provided in adequate quantities and can be collected or deposited at or adjacent the membrane in a manner which does not establish a metallic barrier structure which might otherwise stop or adversely affect operation of the cell. Further, the porous absorbant carrier 22 supports and carries the metal particles of the catalyst in such a manner that the surface area of and the number of active sites presented by the catalyst material is maintained at a high level and is not materially diminished by intimate compact bridging and bearing engagement of the metal particle, one against the other.

In carrying out my invention, the ion transfer membrane M between and establishing a barrier between the liquid aqueous electrolytes E-1 and E-2 is or can be similar to the above noted membrane M', except that the carrier 22 provided in the membrane structure M' is not required and is therefore eliminated.

I have conducted tests with my new cell wherein certain commercially available ion exchange sheet-like membrane materials have been used to establish the membranes M and M' and have found such materials to be very satisfactory in operation. However, those referred to commercially available materials which I have thus far tested appear to create more internal resistance in the cells than does the petroleum wax form of membrane described in the foregoing. It is understood and believed that the physical and functional characteristics of many of the ion exchange or transfer films or membranes which are now commercially available can be modified or adjusted to meet those requirements for most effective operation of my new cell structure and it appears likely that one or more such products, which I have not yet found and tested, is presently available.

In accordance with the above, it is anticipated that in commercial embodiments of my invention, the membranes M and M' will be established of and/or include a commercially available ion transfer film or membrane material and that the operation of those cells will be enhanced by the ability of the membranes to allow for the free flow of anions therethrough and the blockage of the flow of the liquids and other particulate materials in the cell structure.

In tests I have conducted with my new cell structure, different nitrogen fuels for the cathode C have been compounded and successfully put to use. Those tests have clearly established that substantially any nitrate compound will work. Below are examples of certain compounds I have tested and the half reactions obtained thereby.

$$CuN_2O_6 + 5H_2O + 10e^- \rightarrow N_2O + 10OH^- / E_{red} = 0.832$$

$$AgNO_3 + H_2O + 2e^- \rightarrow NO_2^- + 2OH^- / E_{red} = 0.789$$

$$2NO = H_2O + 2e^- \rightarrow N_2O + 2OH^- / E_{red} = 0.76$$

$$NO_2^- + H_2O + e^- \rightarrow NO + 2OH^- / E_{red} = 0.46$$

$$2NO_2^- + 2H_2O + 4e^- \rightarrow N_2O_2^{-2} + 4OH^- / E_{red} = 0.18$$

$$2NO_2^- + 3H_2O + 4e^- \rightarrow N_2O + 6OH^- / E_{red} = 0.15$$

$$NO_3^- + H_2O + 2e^- \rightarrow N_2O_4 + 4OH^- / E_{red} = 0.85$$

In the same and/or other tests, various different metals have been used to establish the anode A in my new cell structure. Below are examples of the oxidation process that was observed to occur at different metal anodes and of the half reaction attained thereby.

$$AL + 3OH^- \rightarrow H_2ALO_3^- + H_2O + 3e^- / E_{ox} = 2.35$$

$$Ca + 2OH^- \rightarrow Ca(OH)_2 + 2e^- / E_{ox} = 3.02$$

$$GA + 4OH^- \rightarrow GA(OH)_4^- + 3e^- / E_{ox} = 1.3$$

$$Mg + 2OH^- \rightarrow Mg(OH)_2 + 2e^- / E_{ox} = 2.69$$

$$Mn + 2OH^- \rightarrow Mn(OH)_2 + 2e^- / E_{ox} = 1.55$$

$$Zn + 4OH^- \rightarrow ZnO_2^{2-} + 2H_2O + 2e^- / E_{ox} = 1.216$$

$$La + H \rightarrow La(OH)_3 + 3e^- / E_{ox} = 2.76$$

$$Ba + 2OH^- + 8H_2O \rightarrow Ba(OH)_2 \cdot 8H_2O + 2e^- / E_{ox} 2.97$$

$$Sr + 2OH^- + 8H_2O \rightarrow Sr(OH)_2 \cdot 8H_2O + 2e^- / E_{ox} 2.99$$

$$Th + 4OH^- \rightarrow ThO_2 + 2H_2O + 4e^- / E_{ox} 2.64$$

$$B + 4OH^- \rightarrow H_2BO_3^- + H_2O + 3e^- / E_{ox} = 2.5$$

$$Zr + 4OH^- \rightarrow ZrO(OH)_2 + H_2O + 4e^- / E_{ox} - 2.32$$

$$2Be + 6OH^- \rightarrow Be_2O_3^{-2} + 3H_2O + 4e^- / E_{ox} 2.28$$

$$Si + 6OH^- \rightarrow SiO_3^{-2} + 3H_2O + 4e^- / E_{ox} 1.73$$

Testing has thus far established that the base cathode catalyst in my new cell structure can be advantageously established of copper and/or silver compounds in aqueous solution (preferly $AgNo_3$ and/or $Cu(NO_3)$); secondary or semi-base catalysts can include gold, platinum and/or palladium compounds in aqueous solutions (preferably $H_2(P+CL_6)6H_2O$). Metallic promoters including aluminum, cerium, cesium, chromium, cobalt, gallium, indium, iron, lanthonum, lead, magnesium, manganese, mercury, neodymium, nickel, praseodymium, radium, rhodium, ubidium, samarium, scandium, strontium, terbium, thallium, thorium, thulium, tkn, uranyl, ytterbium, yttrium, zinc and zirconium nitrate aqueous solutions; and non-metallic catalytic promoters such as selenium and tellurium in aqueous solutions (preferably $SeO_2$ and $H\ Te_6Co$) have been found to be effective.

From tests thus far conducted, the preferred percentage of electro-catalysts are as follows:
Base catalysts 90 to 99.99%
Semi-base catalysts 0.001 to 1%
Metal promoters 0.001 to 10%
Non-metallic promoters 0.001 to 10%

In the preferred form and carrying out of my invention illustrated and described above, two electrolytes are provided and the second ion transfer M' is arranged therebetween to prevent commingling of the electrolytes and yet allow for the free movement of hydroxyl ions between the cathode and the anode of the cell. While the foregoing structure and relationship of parts enables the establishment of an exceptionally effective and efficient cell, it has been found that an effective fuel cell can be established in accordance with the broader aspects of my invention when the above noted second ion exchange membrane is eliminated and a single electrolyte is employed.

Throughout the foregoing description of my invention, I have restricted the disclosure to that one preferred carrying out of my invention wherein the cathode electrode is a nitrogen compound established of a nitrate in aqueous solution and is such that when free electrons are added to it, a plus electrical potential or positive cathode half reaction is established and hydroxyl ions are produced.

In practice, and in accordance with the broader aspects of my invention, the cathode electrode can be established of material or elements other than nitrates as long as they establish a positive cathode half reaction and produce hydroxyl ions when free electrons are added to them.

In accordance with the above, it has been determined that bromine, chlorine, iron, lead, manganese, platinum and xenon, when in aqueous solution and compounded with oxygen, will, upon the introduction of free electrons therein, establish positive electric potentials or cathode half reactions and will produce hydroxyl ions as is required in carrying out my invention. Accordingly, in practicing my invention, the cathode electrode can be established with any one of the above noted elements with satisfactory results.

The suitability of each of the above noted alternative elements to establish my cathode electrode is determined largely by the availability and cost of each of the noted elements and by the by-product which it establishes in and during operation of the cell.

At this time, it is believed preferable that an element, such as chlorine, the by-product of which is chlorine gas, is better suited for use in my invention than iron, the by-product of which is iron oxide, since chlorine gas can be more easily removed from the cell structure and disposed of than iron oxide.

Having described one typical preferred form and embodiment of my invention in sufficient detail to enable those skilled in the art to practice the invention, and having described certain of those variations and/or modifications that can be therein, I do not intend or wish to restrict my invention to specific details herein set forth but wish to reserve to myself any modifications and/or variations of my invention which may appear to those skilled in the art and which fall within the scope of the following claims:

Having described my invention, I claim:

1. A fuel cell comprising a fuel metal anode, a nitrogen compound fuel cathode solution spaced from the anode, a hydroxyl ion transfer membrane between the anode and the cathode solution and carrying a metallic catalyst for the cathode solution, an aqueous electrolyte solution between and contacting the anode and the membrane, and an electric circuit connected with and conducting free electrons from the anode and to the cathode.

2. The fuel cell set forth in claim 1 wherein the electrolyte is formulated primarily of a base material in aqueous solution and said nitrogen compound cathode solution is formulated primarily of a nitrate in aqueous solution.

3. The fuel cell set forth in claim 1 wherein a second hydroxyl ion transfer membrane is positioned between the first mentioned membrane and the anode and wherein the electrolyte includes a first solution between the membranes and formulated for efficient conducting of ions from the cathode toward the anode and a second solution between the second membrane and the anode and formulated for efficient conducting of said ions from said second membrane to said anode and to have minimal corrosion reaction on and with said anode.

4. The fuel cell set forth in claim 3 wherein the electrolytes are formulated primarily of base materials in aqueous solutions and said nitrogen compound cathode solution is formulated primarily of a nitrate in aqueous solution.

5. The fuel cell set forth in claim 4 wherein the PH of the first and second electrolyte solutions are different and wherein the PH and the corrosion reaction of said second electrolyte with the anode is established at desired level by the addition of an acid having a predetermined PK1 value to the said second electrolyte.

6. The fuel cell set forth in claim 3 wherein the PH of the first and second electrolyte solutions are different and wherein the PH and the corrosion reaction of said second electrolyte with the anode is established at desired level by the addition of an acid having a predetermined PK1 value of the said second electrolyte.

7. The fuel cell set forth in claim 1 wherein said membrane has a porous catalyst carrying material at a surface of the membrane opposing the cathode solution to receive cathode solution and to hold and carry particles of a metallic catalyst.

8. The fuel cell set forth in claim 2 wherein said membrane has a porous catalyst carrying material at a surface of the membrane opposing the cathode solution to receive cathode solution and to hold and carry particles of a metallic catalyst.

9. The fuel cell set forth in claim 3 wherein said second membrane has a porous catalyst carrying material at a surface of the membrane opposing the cathode solution to receive cathode solution and to hold and carry particles of a metallic catalyst.

10. The fuel cell set forth in claim 7 wherein said metallic catalyst is established of the metal components of the ions of a predetermined volume of metallic nitrate in the cathode nitrogen compound solution and electrons conducted into said solution whereby molecules of the metal components are cyclically deposited on and within the catalyst carrying material and broken into ions by electrolytic dissociation during operation of the cell.

11. The fuel cell set forth in claim 2 wherein said metallic catalyst is established of the metal components of the ions of a predetermined volume of metallic nitrate in the cathode nitrogen compound solution and electrons conducted into said solution whereby molecules of the metal components are cyclically deposited on and within the catalyst carrying material and broken into ions by electrolitic dissociation during operation of the cell.

12. The fuel cell set forth in claim 3 wherein said metallic catalyst is established of the metal components of the ions of a predetermined volume of metallic nitrate in the cathode nitrogen compound solution and electrons conducted into said solution whereby molecules of the metal components are cyclically deposited on and within the catalyst carrying material and broken into ions by electrolitic dissociation during operation of the cell.

13. The fuel cell set forth in claim 1 wherein said membrane has a catalyst carrying surface opposing the cathode solution at which particles of a metallic catalyst are deposited.

14. The fuel cell set forth in claim 2 wherein said membrane has a catalyst carrying surface opposing the cathode solution at which particles of a metallic catalyst are deposited.

15. The fuel cell set forth in claim 3 wherein said second membrane has a catalyst carrying surface opposing the cathode solution at which particles of a metallic catalyst are deposited.

16. A fuel cell comprising a fuel metal anode, a cathode solution spaced from the anode and composed of a selected element and oxygen, said element is selected from those elements which, when compounded with oxygen, produce hydroxyl ions and establish positive cathode half reactions when free electrons are conducted into it, a hydroxyl ion transfer membrane between the anode and cathode and carrying a metallic catalyst for the cathode solution, an electrolyte between and contacting the anode and the membrane; and an electric circuit connected with and between the anode and cathode and conducting free electrons to the cathode solution.

17. The fuel cell set forth in claim 16 wherein the electrolyte is an aqueous solution of base material and said cathode solution is composed of an aqueous solution of said element.

18. The fuel cell set forth in claim 16 including a second hydroxyl ion transfer membrane in spaced position between the first mentioned membrane and the anode and wherein the electrolyte includes a first solution between the membranes and formulated for efficient conducting of ions from the cathode toward the anode and a second solution between the second membrane and the anode and formulated for efficient conducting of said ions from the second membrane to the anode and to have minimal corrosion reaction with said anode.

* * * * *